(12) United States Patent
Shikh

(10) Patent No.: US 11,339,850 B2
(45) Date of Patent: May 24, 2022

(54) ORTHOGONALLY-OPTIMIZED VIBRATION ISOLATION

(71) Applicant: Danny Shikh, Rehovot (IL)

(72) Inventor: Danny Shikh, Rehovot (IL)

( * ) Notice: Subject to any disclaimer, the term of this patent is extended or adjusted under 35 U.S.C. 154(b) by 0 days.

(21) Appl. No.: 17/021,037

(22) Filed: Sep. 15, 2020

(65) Prior Publication Data

US 2020/0408274 A1     Dec. 31, 2020

Related U.S. Application Data

(62) Division of application No. 16/010,525, filed on Jun. 18, 2018, now Pat. No. 10,816,057.

(51) Int. Cl.

| | |
|---|---|
| *F16F 15/00* | (2006.01) |
| *F16F 15/02* | (2006.01) |
| *F16M 11/22* | (2006.01) |
| *F16F 15/04* | (2006.01) |

(52) U.S. Cl.
CPC .......... *F16F 15/022* (2013.01); *F16F 15/021* (2013.01); *F16F 15/04* (2013.01); *F16M 11/22* (2013.01); *F16F 2228/066* (2013.01); *F16F 2230/08* (2013.01); *F16F 2230/18* (2013.01)

(58) Field of Classification Search
None
See application file for complete search history.

(56) References Cited

U.S. PATENT DOCUMENTS

| | | | | |
|---|---|---|---|---|
| 9,308,791 | B2 * | 4/2016 | Korson | B60D 1/62 |
| 10,184,539 | B2 * | 1/2019 | Kraner | F16F 7/1011 |
| 2006/0225977 | A1 * | 10/2006 | Melz | F16F 15/007 188/266.7 |
| 2010/0030384 | A1 * | 2/2010 | Kraner | F16F 15/02 700/280 |
| 2011/0031373 | A1 * | 2/2011 | Fortes | F16M 11/14 248/600 |
| 2013/0180350 | A1 * | 7/2013 | Kraus | F16F 13/264 74/108 |
| 2013/0328253 | A1 * | 12/2013 | Kraner | F16F 15/022 267/140.14 |

* cited by examiner

*Primary Examiner* — Steven M Marsh

(57) ABSTRACT

A vibration isolation device for optimally decoupling shear forces that are orthogonal to the principal direction of isolation from microvibrations. A pivoting load support element is free to pivot about a pivot point in response to shear forces, with optimal isolation from coupling to the principal direction of vibration isolation. A friction free bearing for small motion is provided to respond to the forces perpendicular to the principal direction of vibration isolation. An internal load support plate associated with the pivoting element is supported by equalizing springs and is damped by an active actuator driven according to a sensor on the internal load support plate. Adjustment points, such as screws, adjust the pivoting element with respect to the fixed pivot point.

7 Claims, 5 Drawing Sheets

ORTHOGONALLY-OPTIMIZED VIBRATION ISOLATION

CROSS REFERENCE TO RELATED APPLICATION

This application is a Divisional application of U.S. patent application Ser. No. 16/010,525, filed Jun. 18, 2018, entitled "Orthogonally-optimized vibration isolation", the priority of which is hereby claimed.

FIELD

The present invention relates to vibration isolation and, more particularly, to vibration-isolation apparatus orthogonally configured to maximize decoupling and optimize performance of active vibration isolation in each degree of freedom, for the disturbances coming from the floor to the isolated device or from the device coming to the floor.

BACKGROUND

Apparatus for isolating a stationary payload object from vibration (particularly a delicate object such as a measurement instrument or precision fabrication device) typically is designed to isolate the object from vibration in more than one axis. In real applications, however, it has proved to be difficult to build well-orthogonally-decoupled multi-axis vibration suppression systems. The issue is even more significant when isolating larger systems, where more than one actuator is needed to compensate for vibrational distortion in multiple axes. Cross-talk between axes significantly degrades performance of each actively controlled axis, and can often compromise feedback control loop stability. Equally or even more difficult is to actively reduce vibration generated by device and going from that device to the floor (pumps, compressors, moving stages). It is therefore advantageous and desirable to have apparatus which optimizes vibration isolation along single principal direction, while optimally decoupling vibrational modes orthogonal to that direction. This goal is attained by embodiments of the present invention.

SUMMARY

Embodiments of the present invention provide apparatus for vibration isolation in a principal direction, in a manner that is optimally decoupled from vibration that is orthogonal to the direction.

According to various embodiments of the present invention, cross-axis decoupling is accomplished by providing a pivoting member from one side of the apparatus, which pivots with respect to a fixed pivot point and a friction-free bearing (for microvibrational displacements) from the other side of the apparatus. The pivoting member pivots in response to forces external to the apparatus which are orthogonal to the principal vibration isolation direction of the apparatus, so that only the component of the external forces, applied from either side of the apparatus, along the principal vibration isolation axis is applied to an internal isolating load support plate of the apparatus. According to these embodiments, the friction-free bearing (for microvibrational displacements) is mounted in such a way that only external forces which are parallel to the principal direction of isolation are passing through the bearing and applied to the apparatus.

It is noted that the magnitude of the vibrational waves is very small—these are generally referred to as "microvibration".

BRIEF DESCRIPTION OF THE DRAWINGS

The present invention will be more fully understood from the following detailed description of the embodiments thereof, taken together with the drawings in which.

Figure 1A:
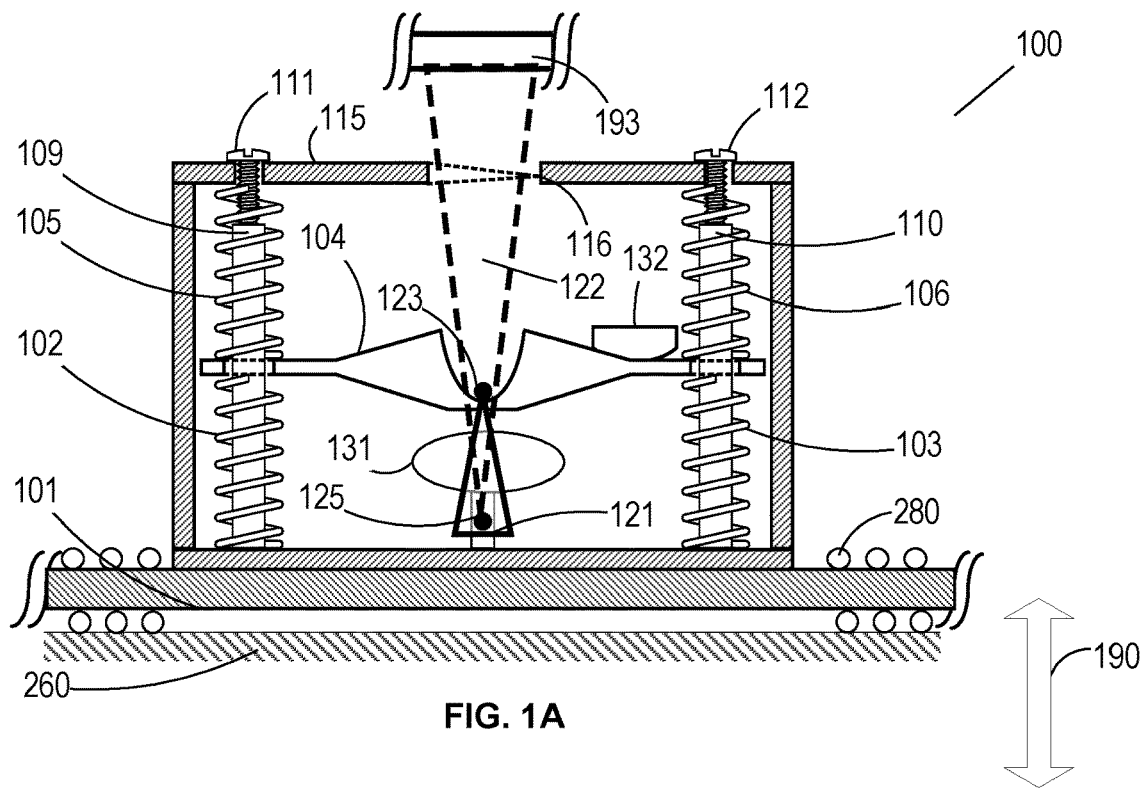
FIG. 1A conceptually illustrates a cross-section of a cross-axis decoupling device according to an embodiment of the present invention under the influence of a force not along the direction of gravitational force.

For simplicity and clarity of illustration, elements shown in the figures are not necessarily drawn to scale, and the dimensions and/or locations of some elements may be exaggerated relative to other elements. In addition, reference numerals may be repeated among the figures to indicate corresponding or analogous elements.

DETAILED DESCRIPTION

The principles and operation of a cross-axis decoupling vibration isolator according to various embodiments of the present invention may be understood with reference to the drawings and the accompanying description.

FIG. 1A conceptually illustrates a cross-section of a cross-axis decoupling device 100 according to an embodiment of the present invention. An isolating mechanism 115 is supported by structure 101, which is attached to shear decoupling, friction free, for micro vibrational displacements, bearing 280, and rests on a supporting surface 260. Vibration force 190, if generated from the surface 260, is translated through structure 101, to support isolated device payload 193, in case vibration force 190 is generated on the payload 193, and translated through structure 101 to surface 260. Vibration force 190 is applied in a principal vibration isolation direction, normal to base plate of support structure 101. Lower load equalizing springs 102 and 103 support an internal load isolating plate 104. Upper equalizing springs 105 and 106 extend from internal load isolating plate 104 to a top plate of the mechanism 115, which is a continuation of base plate of support structure 101 through the spacing rods 109 and 110 positioned within springs 102-105 and 103-106 respectively. The precise position of isolating plate 104 relative to base plate of support structure 101 is related to the compression of springs 102-105 and 103-106, and is adjusted by means of adjustment screws 111 and 112. A pivot point 123 is mounted on internal load isolating plate 104 so that load support pendulum 121 and internal load isolating plate 104 may freely pivot relative to one another. A pivot point 125 is mounted at the bottom of load support pendulum 121, so that pendulum 121 and member 122, which is continuation of payload 193, may freely pivot relative to one another. Pivoting support member 122 passes through an opening 116 in top mechanism 115 and is exposed for supporting a payload 193.

The stiffness of springs 102-105, 103-106 is optimally adjusted by screws 111 and 112 to maximize effectiveness of feedback control loop, based on a inertia motion sensor 132 and a directional actuator 131, in compensation of the dynamic (vibrational) force 190.

In the embodiment described above, pendulum 121 is configured as a hanging pendulum, which by itself is statically stable.

Internal load isolating plate 104 is characterized by having a restricted ability to move only in a principal vibration isolation direction along spacing rods 109 and 110, and is further isolated from vibration of support structure 101 or plate 193 by an actuator 131 which provides active vibration damping and which is driven according to signals from an inertial sensor 132 that is associated with internal load isolating plate 104.

Figure 1B:
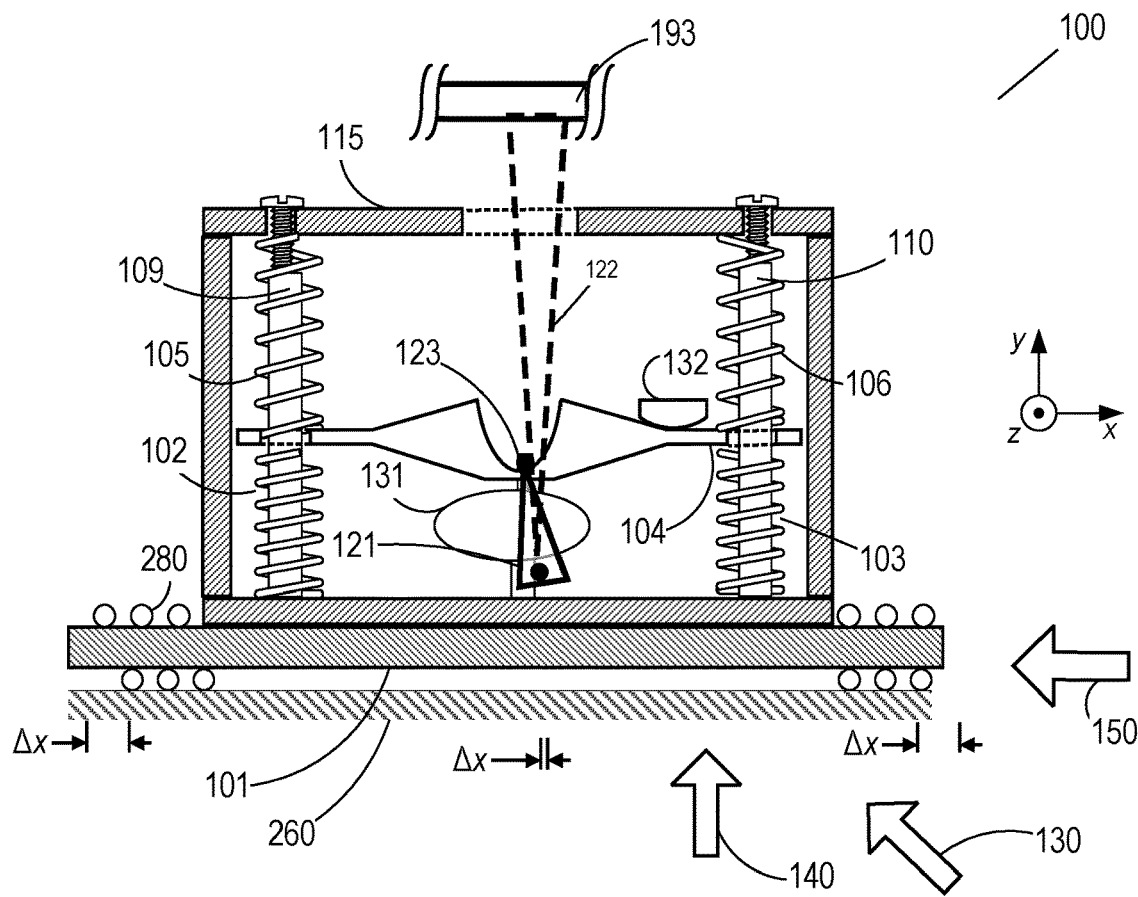
FIG. 1B conceptually illustrates the response of a shear decoupling device according to FIG. 1A, under the influence of a cross-axis force not orthogonal to the direction of gravitational force.

FIG. 1B conceptually illustrates the response of cross-axis decoupling device 100 under the influence of an external force 160 generated by device rested on payload 193. Because of pivot device 121, 122, 123, force 160 is split into force 170 along principal direction of isolation, and force 180, normal to principal direction of isolation. In FIG. 1B, force 180 is shown causing a displacement of pendulum 121 and a pivoting support member 122. The distance of the displacement is denoted as Δx. Load isolating plate 104 and structure 101 however, are isolated from displacing force 180. After displacing force 180 is no longer present, pivoting pendulum 121 resiliently returns to its original shape, as shown in FIG. 1A.

Figure 1C:
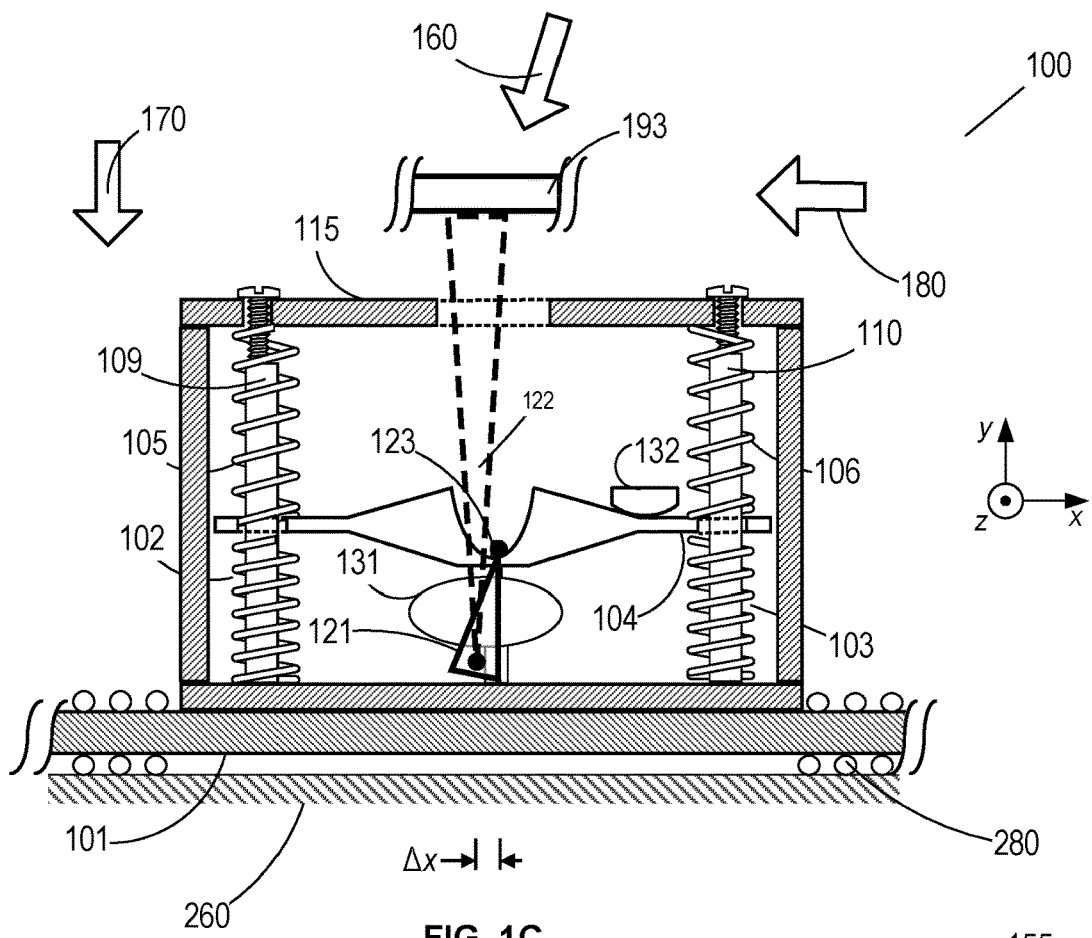
FIG. 1C shows a schematic representation of a cross-axis decoupling device according to an embodiment of the present invention.

FIG. 1C conceptually illustrates the response of cross-axis decoupling device 100 under the influence of an external force 130 generated by surface 260. Because of bearing 280, force 130 is split into force 140 along principal direction of isolation, and force 150 (FIG. 1B), normal to principal direction of isolation. Force 150 is shown causing a displacement of surface 260. Inertia mass of the Device resting on payload 193, causing shift of bearing 280, denoted as Δx displacement. Pivot device 121, 122, 123 may also tilt to compensate residual motion Δx Load isolating plate 104 and payload 193, however, are isolated from displacing force 150. After displacing force 150 is no longer present, bearing 280 and pivoting pendulum 121 resiliently returns to its original shape, as shown in FIG. 1A.

It is once again emphasized that the microvibrational displacements shown in FIG. 1B and FIG. 1C are greatly exaggerated in dimension for the purpose of illustration and are not drawn to scale.

Figure 1D:
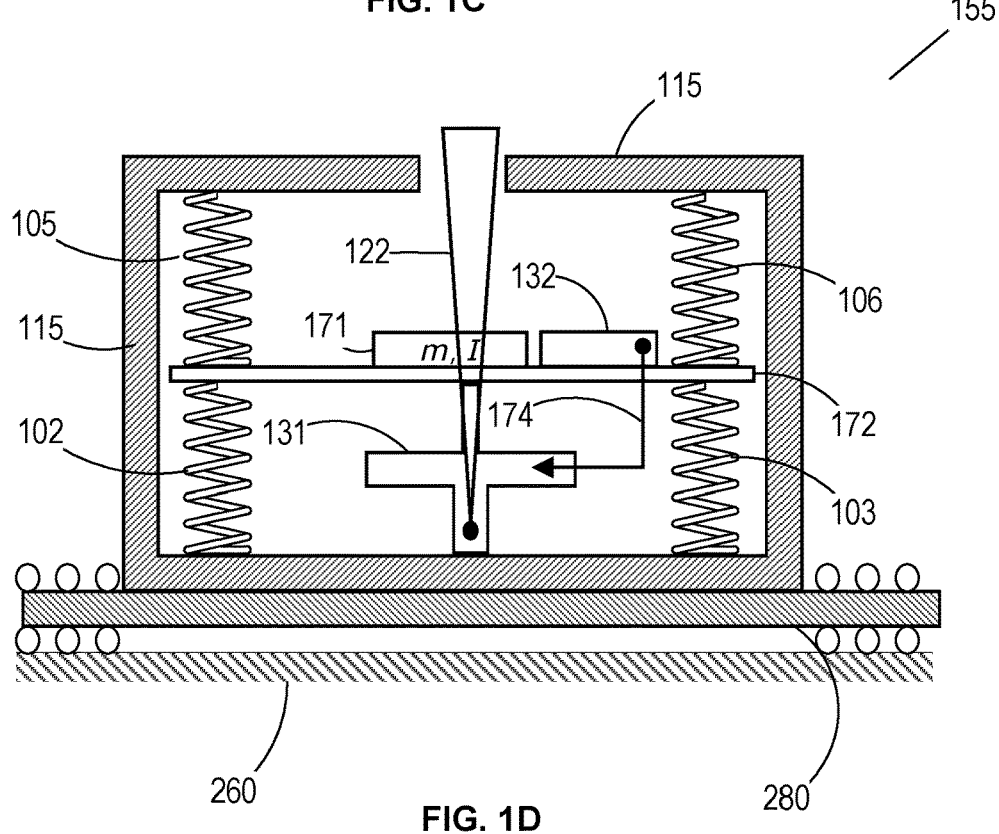
FIG. 1D shows a schematic representation of a cross-axis decoupling device according to an embodiment of the present invention.

FIG. 1D shows a schematic representation of cross-axis decoupling device 155 according to an embodiment of the present invention. In this schematic representation, the internal load isolating plate 104 is shown as a lumped-parameter component 171 having an inertial mass m, resting on an internal plate 172 between equalizing springs 102, 103 and equalizing springs 105, 106, upon which a sensor 173 also rests, with an electrical connection 174 to an actuator 175. In this representation, internal plate 172 is a "virtual" component, whose physical properties (as a transitional mass m) are embodied in lumped-parameter component 171.

Electrical connection 174 also incorporates the lumped parameters of active electronics for driving actuator 175 according to signals from sensor 173. An advantage of having a schematic representation, such as that of FIG. 1D, is that cross-axis decoupling device 100 can be put to effective use in more extensive apparatus, and thus analyzed more easily in terms of lumped parameter m. The schematic representation is also simpler to illustrate in complex assemblies.

In this lumped-parameter model: internal plate 172 in contact with sensor 173, which has electrical connection 174 to actuator 175, which in turn is in contact with internal place 172, together form a feedback loop for transferring signals from sensor 173 to actuator 175 via electrical connection 174, where actuator 175 is responsive to the signals from sensor 173 to actively contribute to isolating pivoting support member 122 from microvibrational displacements affecting bottom surface 280, upon which the device rests, or transferred from payload through support member 122.

Figure 2A:
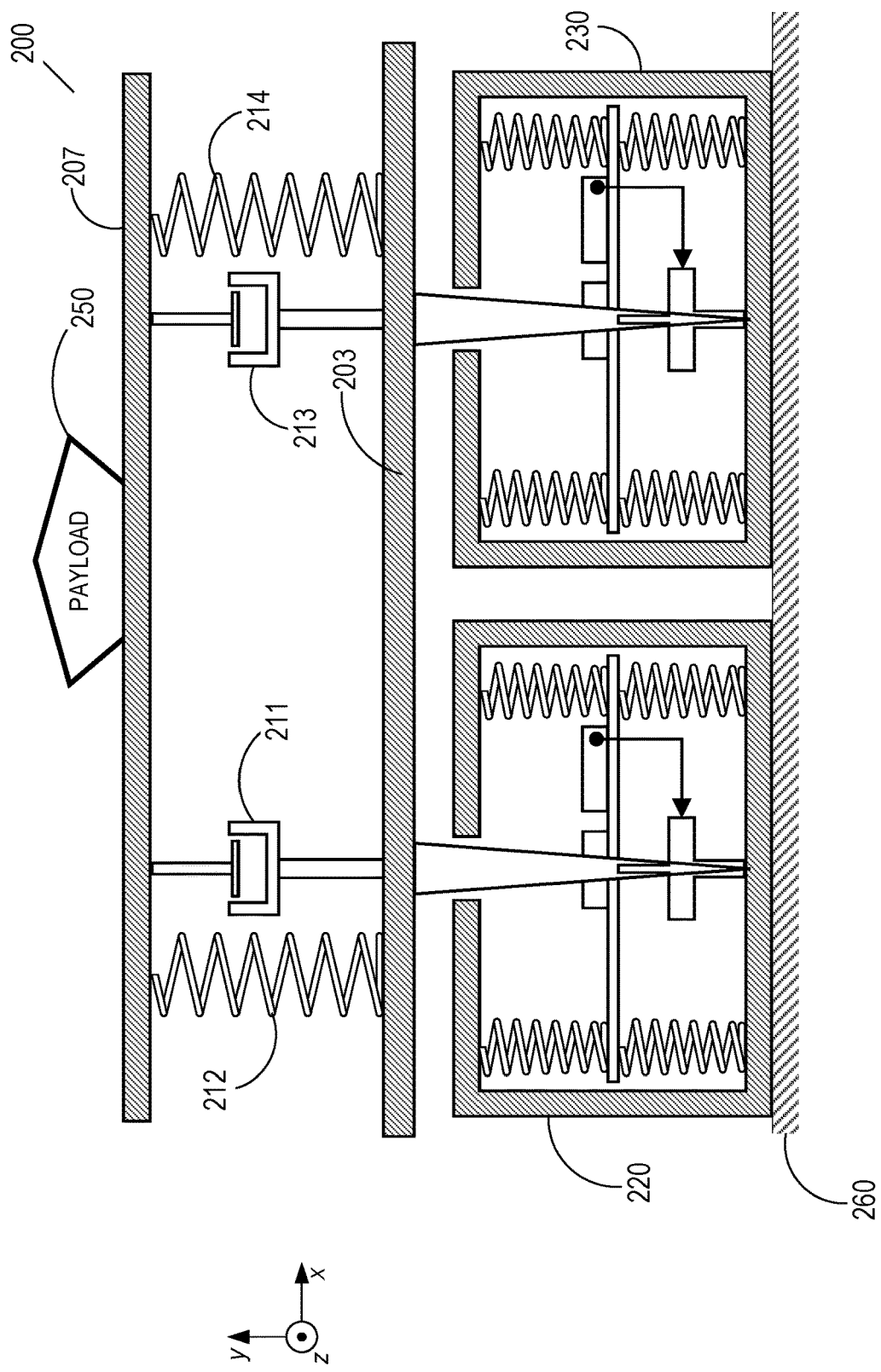
FIG. 2A conceptually illustrates a cross-section of vibration isolation apparatus with cross-axis decoupling devices according to an embodiment of the present invention.

FIG. 2A conceptually illustrates a cross-section of a vibration isolation apparatus 200 incorporating cross-axis decoupling devices 220 and 230 according to an embodiment of the present invention. Both devices 220 and 230 are shown in the schematic representation of FIG. 1D. Cross-axis decoupling devices 220 and 230 provide independent vibration force compensation, in the principal vibration isolation direction, on a plate 203, which is resting on the support bases of the respective pivoting support members of cross-axis decoupling devices 220 and 230. Plate 203 provides stabilization for the pendulum configuration of the pivoting support members as described previously and illustrated in FIG. 1A. On plate 203 are mounted upper load support springs 212 and 214, and dampers 211 and 213 to support a payload platform 207, upon which rests a payload object 250 which is to be isolated from the vibrations of a surface 260. In other variation, when vibration generated by payload 250 itself (due to its internal moving components—moving stages, fans, etc.), surface 260 is to be isolated. Dynamic and static forces, applied to spring-damper units 211-212 and 213-214, can be different, due to the internal processes in payload 250 and its position on plate 207. This means that displacement of the different points on plate 203 also varies significantly. Presence of the respective pivot supports in devices 220 and 230 plays an important role in decoupling forces applied to the internal load support plates of those devices and hence the performance of vibrational compensation control loops of devices 220 and 230.

Figure 2B:
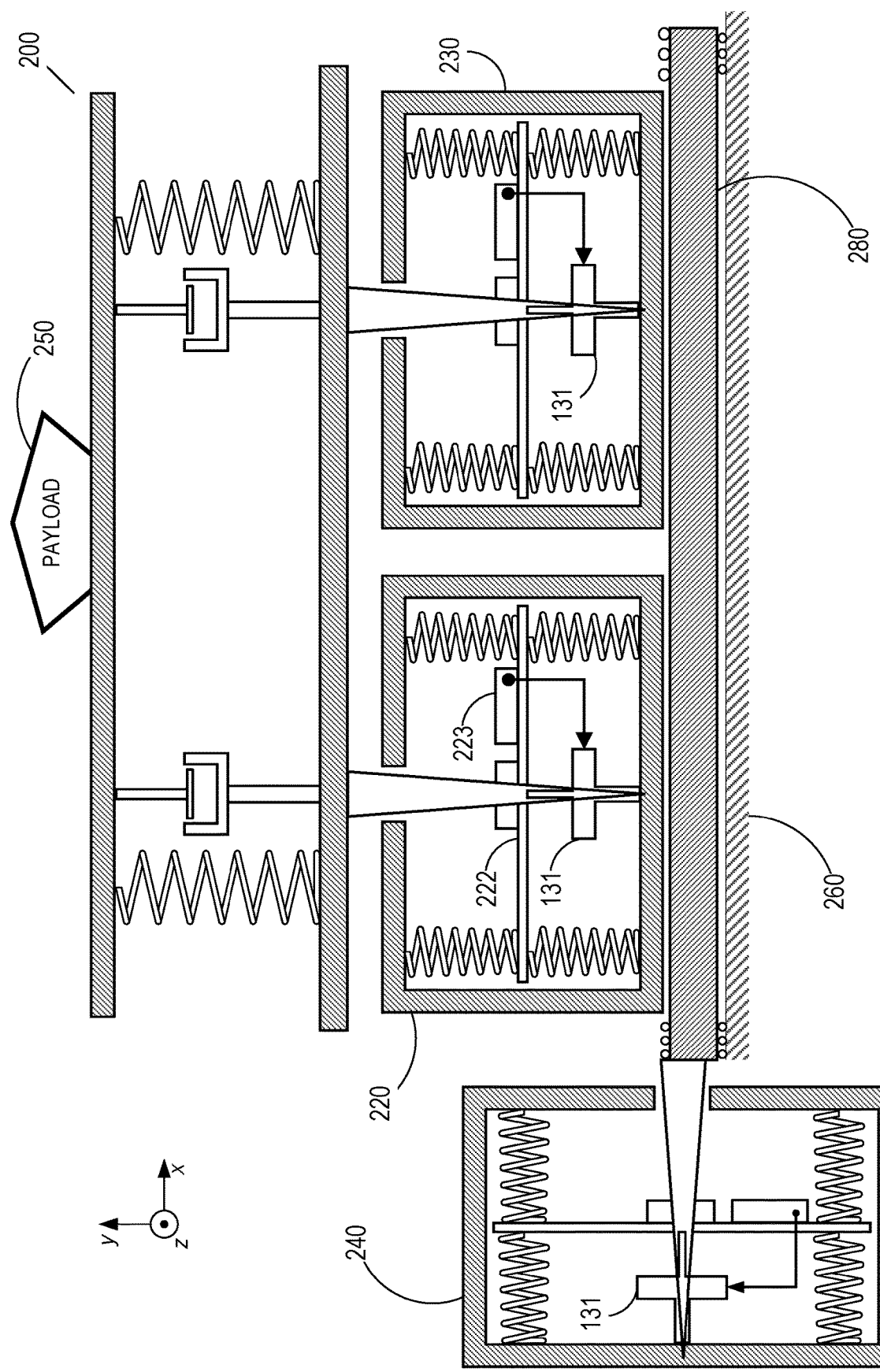
FIG. 2B conceptually illustrates a cross-section of vibration isolation multiple-axis apparatus with cross-axis decoupling devices according to an embodiment of the present invention.

In an embodiment illustrated in FIG. 2B, cross-axis decoupling devices 220 and 230 rest on frictionless (at microvibrational displacements) support bearings located above a lower plate 280. In turn, lower plate 280 rests on frictionless (at microvibrational displacements) support bearings above surface 260. The position of lower plate 280 is stabilized by a cross-axis decoupling device 240, which is oriented at an angle of 90 degrees with respect to the principal vibration isolation direction. In this particular embodiment, decoupling device 220 has a sensor 223 on an internal plate 222, and sensor 223 is connected via an electrical connection 224 to an actuator 225. (A similar arrangement is provided for decoupling device 230.) Likewise, decoupling device 240 has a sensor 243 on an internal plate 242, and sensor 243 is connected via an electrical connection 244 to an actuator 245, so that the feedback loop for vibration isolation orthogonal to principal vibration isolation direction is a local feedback loop internal to device 240.

Figure 2C:
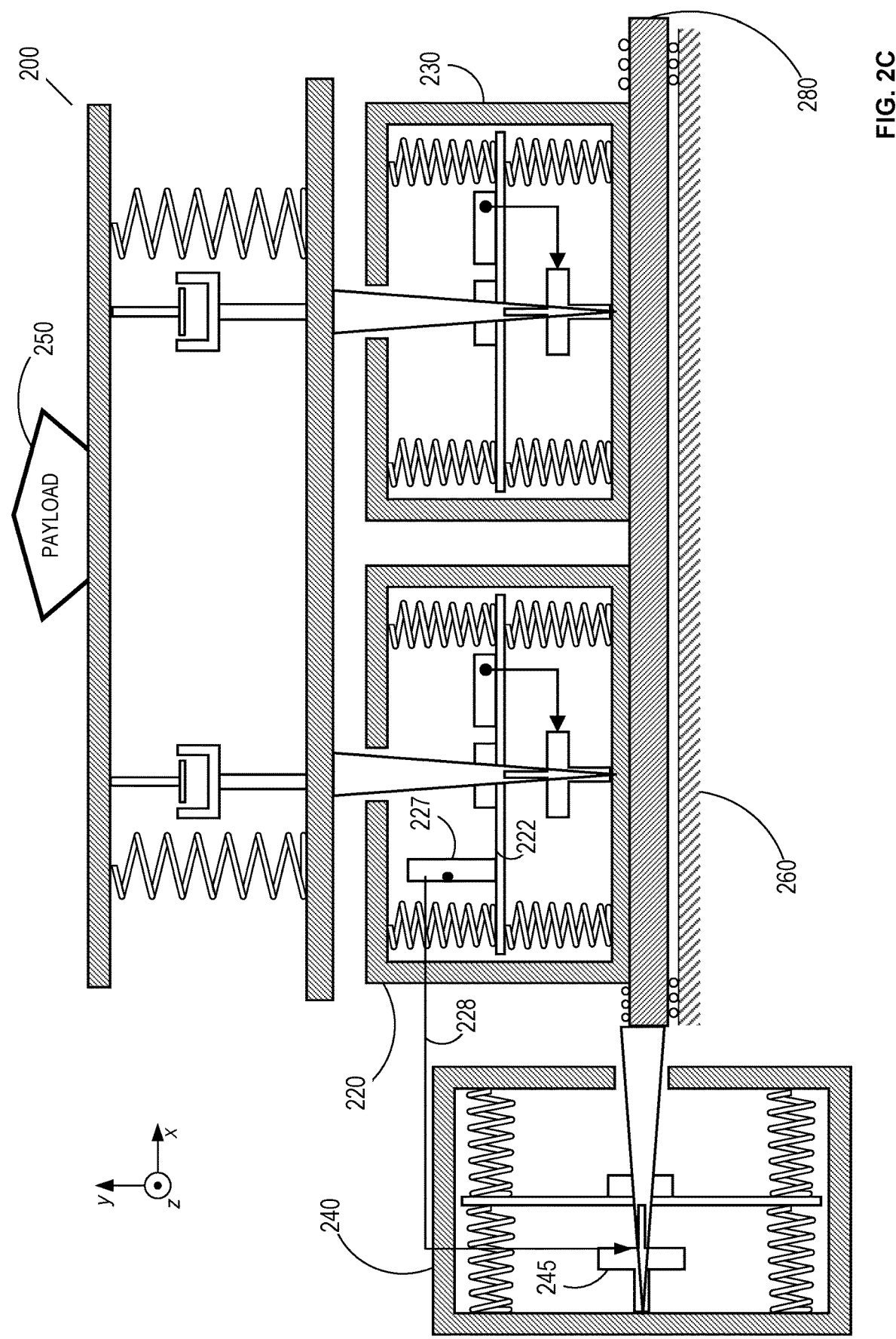
FIG. 2C illustrates another embodiment with a feedback loop for isolating from vibration orthogonal to the principal vibration isolation direction.

In another embodiment illustrated in FIG. 2C, a different feedback loop is employed for isolating from vibration that is orthogonal to principal vibration isolation direction. In this embodiment, a sensor 227 in contact with internal plate 222 in device 220 is connected via an electrical connection 228 to actuator 245 in device 240, so that the feedback loop for vibration isolation orthogonal to principal vibration isolation direction 150 is a global feedback loop for apparatus 200.

While the invention has been described with respect to a limited number of embodiments, it will be appreciated that many variations, modifications and other applications of the invention may be made.

The invention claimed is:

1. A vibration isolation apparatus for isolating a payload object from vibration in a principal direction and for decoupling the payload object from vibration orthogonal to the principal direction, the device comprising:
   a base plate, for contact with a surface that is subject to vibration in the principal direction;
   at least one decoupling device, each of the at least one decoupling device comprising:
   at least one lower equalizing spring from the base plate to a first internal load support plate;
   at least one upper equalizing spring from the first internal load support plate to an upper plate;
   a pivoting load support element arranged to pivot about a pivot point on a surface of the first internal load support plate in a direction substantially orthogonal to the principal direction of vibration isolation;
   at least one suspension spring from the upper plate to a payload support platform; and
   at least one damper from the upper plate to the payload support platform.

2. The vibration isolation apparatus of claim 1, comprising a plurality of decoupling devices.

3. The vibration isolation apparatus of claim 2, wherein at least one of the plurality of decoupling devices has a principal direction of vibration isolation that is orthogonal to the principal direction of vibration isolation of at least one other of the plurality of decoupling devices.

4. The vibration isolation apparatus of claim 3, wherein the apparatus further comprises:
   a sensor in contact with a second internal load support plate;
   an active actuator in contact with a third internal load support plate; and
   an electrical connection between the sensor and the active actuator, wherein the active actuator is responsive to a signal from the sensor.

5. The vibration isolation apparatus of claim 4, wherein the sensor and the actuator are in the same decoupling device.

6. The vibration isolation apparatus of claim 4, wherein the sensor and the actuator are in different decoupling devices.

7. The vibration isolation apparatus of claim 4, wherein the sensor is in a decoupling device for isolating from vibration in the principal direction and the actuator is in a decoupling device for isolating from vibration orthogonal to the principal direction.

* * * * *